United States Patent [19]

Glawitsch

[11] Patent Number: 5,788,053
[45] Date of Patent: Aug. 4, 1998

[54] DEVICE FOR SEPARATION OF BODIES

[75] Inventor: Gerhard Glawitsch, Gleisdorf, Austria

[73] Assignee: Binder+Co. Aktiengesellschaft, Gleisdorf, Austria

[21] Appl. No.: 565,725

[22] Filed: Nov. 30, 1995

[30] Foreign Application Priority Data

Dec. 20, 1994 [AT] Austria ..................... 2365/94

[51] Int. Cl.$^6$ .......................................... B65G 47/12
[52] U.S. Cl. ...................... 198/453; 198/396; 198/443
[58] Field of Search .......................... 198/453, 443, 198/396

[56] References Cited

U.S. PATENT DOCUMENTS

| | | | |
|---|---|---|---|
| 2,941,652 | 6/1960 | Miller | 198/453 |
| 2,956,665 | 10/1960 | Arlin | 198/443 |
| 3,232,411 | 2/1966 | Kulig | 198/443 |
| 3,240,311 | 3/1966 | Hofer et al. | 198/443 |
| 3,375,916 | 4/1968 | Greiner | 198/443 |
| 4,768,643 | 9/1988 | Lenhart | |
| 4,815,580 | 3/1989 | Schanz et al. | 198/453 |
| 5,248,025 | 9/1993 | Neu | |
| 5,460,271 | 10/1995 | Kenny et al. | 198/453 |

FOREIGN PATENT DOCUMENTS

| | | |
|---|---|---|
| 2 259 768 | 8/1975 | France. |
| 24 39 136 | 3/1975 | Germany. |
| 25 41 813 | 4/1976 | Germany. |

*Primary Examiner*—Karen B. Merritt
*Assistant Examiner*—Gregory A. Morse
*Attorney, Agent, or Firm*—Collard & Roe, P.C.

[57] ABSTRACT

Device for separating bodies with: a conveying device comprising at least one rim proceeding in the conveying direction; at least one guiding device which is permanently mounted at a distance which is significantly smaller than the dimensions perpendicular to the conveying device of the bodies to be separated, which guiding device comprises a deflector which forms an angle with the direction of movement of the conveying device; and a feeding position for the bodies. In order to allow a reliable separation of the bodies, it is provided that the deflector of the guiding device with its—viewed in the conveying direction—trailing edge ends at a distance before the nearest rim of the conveying device, so that an unobstructed conveying path for the bodies to be separated remains between the trailing edge of the deflector and the nearest rim of the conveying device.

13 Claims, 1 Drawing Sheet

DEVICE FOR SEPARATION OF BODIES

FIELD OF THE INVENTION

The invention relates to a device for the separation of bodies.

Hollow bodies, especially containers made of paper, plastic or metals, are frequently used as packaging material for various products. Owing to considerations concerning the economic transport of goods, it is attempted to construct particularly lightweight containers. In the foodstuffs industry, so-called "lost containers" are frequently utilized due to hygienic requirements. Packaging made of such hollow bodies is known to the consumer as light bottles, beakers or blister packaging.

In order to preserve resources and the environment, legislators as well as the industry and consumers strive to reuse a part of the garbage resulting from packaging, a process which is commonly called recycling. From a commercial viewpoint, recycling is feasible only if highly mechanized and automated installations are available. In order to gain usable raw materials from packaging refuse, a chain of processing steps is required. One of these steps is the separation or sorting of the objects, usually requiring certain qualitative or quantitative features such as materials, size and shape to be identified by a device. In order to allow unambiguous recognition, the objects must be directed past the recognition device one by one. This takes place through a device which reliably separates the objects from a heap and separately conveys them to the succeeding processing stage.

A device as described above is known from the French patent application FR-PS 2 259 76, which separates loosely stacked plates of a similar kind. This takes place utilizing a rotating cone arranged in a fixed cylinder, the rotating direction of said cone being alternated during operation. To that end, a special mechanism for controlling the operating sequence is required. In particular, the plates in question to be separated are massive metallic brake discs, which limit the separating speed through their weight.

Furthermore, a device is known from the DE-OS 24 39 136. Here, a coiler plate is provided to whose central area the bodies to be treated, mostly similar bodies featuring the shape of a parallelepiped, are applied. Above this coiler plate, a guide substantially fashioned from adjoining chords of a geometric spiral is arranged which starts close to the center of the coiler plate and whose curvature decreases outwardly and which pushes the objects outward so that they drop onto a conveyer belt over the rim of the coiler plate at an intended place.

However, this known device serves not so much the separation than an alignment of the single objects which is stipulated by the friction between said objects and the guide.

Furthermore, a device has been known from the U.S. Pat. No. 5,248, 025 which features a coiler plate with a superimposed cone in its center To the surface generated by said cone, a number of identical objects, particularly tablets, is delivered. Said coiler plate is surrounded by a cylinder wall which comprises only one discharge aperture which is penetrated by a guide whose unobstructed width corresponds to the diameter of one tablet.

In this device a separation and an arrangment in a row respectively of the tablets do take place, the guide tangentially continuing the cylinder wall and defining a funnel-shaped aperture for the discharge and alignment of the tablets.

A true separation of objects with a significant distance between the objects is not possible with this device, particularly not if the objects may vary in their size and shape to a slight though discernible extent. In the known case, a deceleration of the tablets eventually occurs in the area of the guide due to a lack of impulse, which leads to the tablets being discharged lying closely next to each other.

Furthermore, a separating device for cylindirical bodies of identical size and shape with elastically deformable walls has been known from the U.S. Pat. No. 4,768,643. In this solution, the bodies are fed to the separating device and separated standing upright, the bodies being conveyed on a conveyer belt comprising perforations and leading over a suction box, above and in small distance to which conveyer belt deflectors are arranged at a right angle. Thereby, owing to a sheet cover covering perforations of the suction box and comprising an edge proceeding diagonally to the conveying direction, the bodies delivered in an area close to the rim are picked up by the conveyer belt and discharged from it earlier than the other containers, which are fed in a particularly arranged formation. These containers are fed into a guide whose width corresponds to the diameter of a container and which adjoins to the trailing edge of the deflector. The rest is also pushed into the guide made up of two parallel guide rails by the deflector proceeding diagonally to the conveying direction, and are aligned one by one into the guide.

The disadvantage of this solution is the high expense of operation due to the required maintaining of an underpressure in the suction box.

Further, from the DE-OS 25 41 813 a separating device for bodies of identical size and shape, particularly tablets, has been known, in which the bodies to be separated are conveyed on a conveyor belt and, by means of a deflector rising up vertically and arranged diagonally to the conveying direction, are passed over to an arrangement of conveyor belts which run at different speeds and are arranged alongside said conveyer belt. The deflector extends diagonally across this arrangement of conveyer belts, and adjoining laterally to said arrangement is a discharge conveyer belt running at a lower speed than the adjacent conveyer belt belonging to said arrangement. A separation of the bodies takes place by means of the arrangement of several conveyer belts which can be driven at different speeds, in combination with the deflector.

The disadvantage of this arrangement lies in the complicated construction required. Additionally, such a device is suited solely for bodies which can stand upright with a high degree of stability, but not for relatively lightweight hollow bodies of low stability.

SUMMARY OF THE INVENTION

It is the object of the present invention to propose a device of the kind described above, which allows a reliable separation of bodies which are similar to each other in size and shape, the term "similar" however being understood not in a strict mathematical sense but rather meaning that the bodies do differ to a discernible extent in size and shape.

It is a further object of the invention to propose such a device which allows the separation of objects of low stability.

The device in question may be designed comprising a straight conveying device featuring a conveying speed constant over its width due to its infinite radius and the resulting constant angular velocity.

In accordance with the invention, this is attained in a device for separating bodies of similar shape and size, which comprises a conveying device for loosely supporting the bodies and conveying the loosely supported bodies substantially continuously and at a constant velocity in a conveying direction. The conveying device has a feeding station for the bodies and two rims extending from the feeding station in the conveying direction, one of the rims being an unobstructed discharge rim. At least two guiding devices are fixedly mounted above the conveying device at a distance substantially smaller than dimensions of the bodies extending perpendicularly to the conveying device, each guiding device comprising a deflector extending obliquely to the conveying direction and having an edge trailing the conveyed bodies in the conveying direction. The edges of the obliquely extending deflectors of the guiding devices immediately succeeding each other in the conveying direction face different rims and are spaced from the rims to define an unobstructed conveying path between the edges and the nearest rim, the nearest rim from which the deflector edge of a first one of the guiding devices is spaced being the unobstructed discharge rim.

The conveying device may be formed by a conveyer belt running at substantially constant speed, though conveying devices in the form of a roller-conveyer with rollers which can at least partly be propelled, as well as a chain conveyer or a jointed-band conveyer, are conceivable. Additionally, it is possible to provide a circular coiler plate. Basically, all conveyer devices may be used which comprise a substantially smooth surface in the conveying area, conveyer belts however being preferable for reasons of a straightforward design.

The deflector devices arranged above the conveyer device cause the bodies—possibly lying side-by-side—to be shoved toward a rim of the conveying device, resulting in the body lying closer to the rim falling off the conveying device in the case of bodies lying side-by-side. Additionally, by means of the deflectors running diagonally, it is ensured that bodies lying side-by-side collide with the deflectors at different instants and therefore are decelerated or deflected respectively at different moments, resulting in the bodies shifting in opposite directions and this way being separated.

The seperating device has the advantage that the bodies are deflected several times during their transport on the conveying device, ensuring a very extensive separation of the bodies, even if they slightly differ in size and shape.

If the separating device comprises at least one further guiding device succeeding the one guiding device in the conveying direction and the edge of the deflector of each further guiding device is positioned gradually closer to the unobstructed discharge rim, the edge of the deflector of a last one further guiding device being spaced from the unobstructed discharge rim a distance substantially corresponding to a dimension of the largest ones of the bodies extending parallel to the conveying device the advantage arises that the size of bodies to be separated may be limited. Additionally, a very high degree of reliability of the separation of the bodies is reached this way.

If another guiding device is arranged between the one guiding device and the immediately succeeding guiding device, the deflector of the other guiding device extending obliquely from the unobstructed discharge rim towards the other rim and ending before a center line of the conveying device falling off of bodies at the second rim of the conveying device can largely be prevented, a very extensive separation of the bodies resulting when they run off the deflector which ends before the center of the conveying device.

preferably, the other guiding device comprises a deflector area extending perpendicularly to the conveying direction and immediately adjoining the unobstructed discharge rim, and the deflector area may have a width corresponding substantially to one fourth the dimension of the largest ones of the bodies extending parallel to the conveying device. This has the advantage that, in the case of bodies lying side-by-side, the one lying closer to the discharge rim is decelerated accordingly when it hits the area of the deflector leading away from the discharge rim, which area runs substantially at a right angle to the conveying direction. In most cases, said body also rotates around an axis running perpendicularly to its contact surface, through which the two bodies are separated.

If at least some of the deflectors of the guiding devices overlap in the conveying direction, each body fed onto the conveying device must touch a deflector of a guiding device, resulting in a separation of bodies possibly lying side-by-side.

In this context it is particularly advantageous if the deflector of the other guiding device has a projected dimension measured perpendicularly to the conveying direction from the unobstructed discharge rim corresponding substantially to a width of the unobstructed conveying path between the edge of the deflector of the one guiding device and the unobstructed rim.

In order to obtain an alignment of the bodies in the conveying direction, the one guiding device and the further guiding devices preferably comprise sliding areas adjoining the edges of the deflectors thereof, the sliding areas extending parallel to the conveying direction.

The separating device preferably further comprises a return mechanism arranged adjacent and below the unobstructed discharge rim, the return mechanism receiving bodies discharged over the unobstructed discharge rim and conveying the discharged bodies to the feed station. This allows a continuous operation of the device with low personnel costs.

preferably, a last one of the guiding devices in the conveying direction has a deflector obliquely extending towards a center line of the conveying device, and at least one sensing device is arranged in the range of the deflector of the last guiding device. This makes it possible to distinguish the single bodies according to certain criteria, such as the material they are made of, particularly if, owing to the composition of the mixture of different bodies, it can be expected that only two different kinds of bodies are contained in the supplied mixture.

In the case that the bodies have to be sorted out from a mixture of greater variety, succeeding the separation device according the invention a sorting device may be installed, in which the separated bodies are led past a greater number of sensors one by one and are sorted according to certain criteria.

If the guiding devices are mounted adjustably it is possible to adjust the angle which the deflectors of the guiding devices form with the conveying direction as well as the width of the unobstructed conveying paths between the trailing edges of the deflectors and the discharge rim of the conveying device according to the respective given requirements.

A further adaptation and optimization of the separation is possible if the constant conveying velocity is adjustable in dependence on the weight of the bodies.

DETAILED DESCRIPTION OF THE INVENTION

Figure 1:
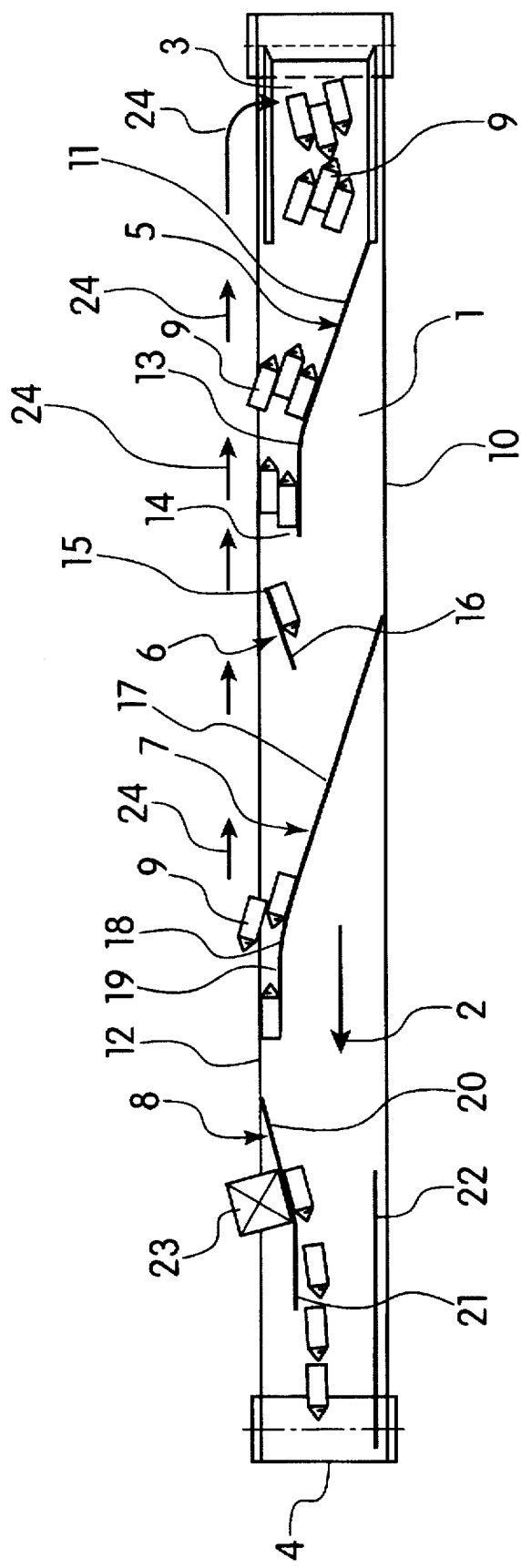

The invention will now be described in detail with reference to the drawing, which schematically shows a device according the invention.

The device according to the invention comprises a conveying device 1 formed by a revolving conveyer belt, the conveying strand of the device running with substantially constant but adjustable speed in the conveying direction 2 from a feeding position 3 to a discharging point 4.

At a slight distance above the conveying strand of the conveying device 1, fixed guiding devices 5, 6, 7, 8 are held, the distance between the conveying strand and the lower rim of the guiding devices 5, 6, 7, 8, being smaller than the lowest height of a body occuring among the bodies to be separated.

The guiding device 5 comprises a deflector 11 proceeding diagonally in the conveying direction 2 from an edge 10 of the conveying device 1. The deflector 11 ends at a distance from one discharge rim 12 of the conveying device 1, so that an unobstructed conveying path for the bodies 9 to be separated remains between the trailing edge 13 of the deflector 11 and the discharge rim 12 of the conveying device 1.

Adjoining to the trailing edge 13 of the deflector 11 of the guiding device 5, there is a sliding area 14 which proceeds in the conveying direction 2 and which limits the unobstructed conveying path.

Succeeding the guiding device 5 in the conveying direction 2 is a guiding device 6, proceeding substantially diagonally from the discharge rim 12 in the direction towards the center of the conveying device 1. The guiding device 6 thereby comprises an area 15 adjoining immediately to the discharge rim 12 and procedding substantially at a right angle to the conveying direction 2. This area 15 has a width which corresponds substantially to a fourth of the width or of the diameter of the largest among the bodies 9 to be separated.

Adjoining to the area 15 is a deflector 16 proceeding in the conveying direction diagonally towards the center of the conveying device 1 and ending before the center of the conveying device 1.

Thereby, the width of the guiding device 6 projected perpendicularly to the conveying direction 2 covers the width of the unobstructed conveying path remaining between the trailing edge 13 of the guiding device 5 and the discharge rim 12.

Succeeding the guiding device 6 in the conveying direction 2 is a further guiding device 7 which proceeds in the conveying direction diagonally from the rim 10 toward the discharge rim 11. In the area of the guiding device 6, the deflector 17 comes closer to the discharge rim 12 than the deflector 11 of the preceding guiding device 5, resulting in a smaller distance between the trailing edge 18 and the discharge rim 12 than in the area of the guiding device 5 and therefore resulting in a narrower conveying path.

Analogous to the guiding device 6, a sliding area 19 proceeding in the conveying direction 2 adjoins to the trailing edge 18 of the deflector 17.

Succeeding the guiding device 7 is the guiding device 8 which proceeds diagonally from the discharge rim 12 toward the center of the conveying device 1. Adjoining to the deflector 20, which proceeds from the discharge rim 12, is a sliding area 21 proceeding in the conveying direction 2. This sliding area, combined with a guide 22 proceeding in the conveying direction 2, defines a conveying path for the separated bodies 9, a falling off the conveying device of the bodies 9 being prevented here.

In the area of the guiding device 8, a sensing device 23 for recognition is arranged which analyzes and respectively identifies the separated bodies 9 according to certain criteria, such as their color and the material they are made of.

At the discharge point 4, the separated bodies 9 drop onto a processing device not shown in the drawing, such as a sorter which sorts the bodies 9 according to the criteria identified by the sensing device mentioned above and which is connected to said sensing device by signal lines not shown in the drawing.

Next to the discharge rim 12 of the conveying device 1 and at a lower level, a return mechanism 24 is arranged which is indicated in the drawing only by a line of arrows. The return mechanism returns bodies 9 which have fallen off the discharge rim 12 to the feeding position 3 so that they are again fed to the separating device.

As can be seen in the drawing, the bodies 9 supplied to the area of the feeding position 3 are deflected toward the discharge rim 12 by the guiding device 5, a portion of the bodies 9 thereby falling onto the return mechanism 24. A portion of the bodies 9 reaches the guiding device 6 through the unobstructed conveying path between the trailing edge 13 and the discharge rim 12, the outward body 9 thereby hitting the area 15 of the guiding device 6 and as a result being decelerated, whereas the body lying inward is solely deflected towards the center of the conveying device 1. As a result, a separation of the two bodies 9 intially lying side-by-side is achieved.

Consequently, the bodies 9 are deflected toward the discharge rim 12 by the guiding device 7. Since the unobstructed conveying path between the trailing edge 18 and the discharge rim 12 is narrower than between the trailing edge 13 and the discharge rim 12, bodies 9 that possibly still lie side-by-side are dropped off the rim and returned to the feeding position 3 by the return mechanism 24, e.g. a conveyer belt.

Eventually, the separated bodies 9 in consecutive order reach the guiding device 8 which deflects them towards the center of the conveying device 1, whereby they are lead past the sensing device 23 which analyzes and identifies them according to certain criteria.

I claim:

1. A device for separating bodies of similar shape and size, the separating device comprising
   (a) a conveying device for loosely supporting the bodies and conveying the loosely supported bodies substantially continuously and at a constant velocity in a conveying direction, the conveying device having
      (1) a feeding station for the bodies and
      (2) two rims extending from the feeding station in the conveying direction, one of the rims being an unobstructed discharge rim,
   (b) at least two guiding devices fixedly mounted above the conveying device at a distance substantially smaller than dimensions of the bodies extending perpendicularly to the conveying device, each guiding device comprising
      (1) a deflector extending obliquely to the conveying direction and having an edge trailing the conveyed bodies in the conveying direction, and
   (c) the edges of the obliquely extending deflectors of the guiding devices immediately succeeding each other in the conveying direction facing different rims and being spaced from the rims to define an unobstructed conveying path between the edges and the nearest rim, the nearest rim from which the deflector edge of a first one of the guiding devices is spaced being the unobstructed discharge rim.

2. The separating device of claim 1, comprising at least one further one of the guiding devices succeeding the one guiding device in the conveying direction and the edge of the deflector of each further guiding device being positioned gradually closer to the unobstructed discharge rim, the edge of the deflector of a last one of the further guiding devices being spaced from the unobstructed discharge rim a distance substantially corresponding to a dimension of the largest ones of the bodies extending parallel to the conveying device.

3. The separating device of claim 2, wherein another one of the guiding devices is arranged between the one guiding device and the immediately succeeding guiding device, the deflector of the other guiding device extending obliquely from the unobstructed discharge rim towards the other rim and ending before a center line of the conveying device.

4. The separating device of claim 3, wherein the other guiding device comprises a deflector area extending perpendicularly to the conveying direction and immediately adjoining the unobstructed discharge rim.

5. The separating device of claim 4, wherein the deflector area has a width corresponding substantially to one fourth the dimension of the largest ones of the bodies extending parallel to the conveying device.

6. The separating device of claim 3, wherein at least some of the deflectors of the guiding devices overlap in the conveying direction.

7. The separating device of claim 3, wherein the deflector of the other guiding device has a projected dimension in a plane extending perpendicularly to the conveying direction from the unobstructed discharge rim corresponding substantially to a width of the unobstructed conveying path between the edge of the deflector of the one guiding device and the unobstructed rim.

8. The separating device of claim 2, wherein the one guiding device and the further guiding devices comprise sliding areas adjoining the edges of the deflectors thereof, the sliding areas extending parallel to the conveying direction.

9. The separating device of claim 1, wherein a last one of the guiding devices in the conveying direction extends from the discharge rim and has a deflector obliquely extending towards a center line of the conveying device.

10. The separating device of claim 9, further comprising at least one sensing device arranged in the range of the deflector of the last guiding device.

11. The separating device of claim 1, wherein the conveying device is a revolving conveyer belt.

12. The separating device of claim 1, further comprising a return mechanism arranged adjacent and below the unobstructed discharge rim, the return mechanism receiving bodies discharged over the unobstructed discharge rim and conveying the discharged bodies to the feed station.

13. The separating device of claim 1, wherein the constant conveying velocity is adjustable in dependence on the weight of the bodies.

* * * * *